United States Patent
Ose et al.

(10) Patent No.: US 8,518,601 B2
(45) Date of Patent: Aug. 27, 2013

(54) GAS SEPARATOR FOR FUEL CELLS AND FUEL CELL EQUIPPED WITH GAS SEPARATOR

(75) Inventors: Norihiro Ose, Toyota (JP); Katsumi Sato, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 855 days.

(21) Appl. No.: 11/990,019

(22) PCT Filed: Oct. 6, 2006

(86) PCT No.: PCT/JP2006/320431
§ 371 (c)(1),
(2), (4) Date: Feb. 5, 2008

(87) PCT Pub. No.: WO2007/043636
PCT Pub. Date: Apr. 19, 2007

(65) Prior Publication Data
US 2008/0280177 A1   Nov. 13, 2008

(30) Foreign Application Priority Data
Oct. 11, 2005   (JP) ................................ 2005-296330

(51) Int. Cl.
*H01M 8/04* (2006.01)
*H01M 8/02* (2006.01)

(52) U.S. Cl.
CPC .................. *H01M 8/0265* (2013.01)
USPC ............ 429/514; 429/457; 429/512; 429/518

(58) Field of Classification Search
CPC ............ H01M 8/0247; H01M 8/0254; H01M 8/0265; H01M 8/0267
USPC ............ 429/20, 26, 30, 34, 38, 39, 457, 512, 429/514, 518
See application file for complete search history.

(56) References Cited

U.S. PATENT DOCUMENTS

| | | | | |
|---|---|---|---|---|
| 3,814,641 | A | * | 6/1974 | Reinberg et al. ................ 216/99 |
| 4,582,765 | A |   | 4/1986 | Kothmann |
| 4,649,091 | A | * | 3/1987 | McElroy ........................ 429/434 |
| 4,769,297 | A | * | 9/1988 | Reiser et al. ................... 429/413 |
| 5,952,118 | A | * | 9/1999 | Ledjeff et al. ................. 429/434 |
| 6,660,419 | B1 | * | 12/2003 | Nishida et al. ................ 429/484 |

(Continued)

FOREIGN PATENT DOCUMENTS

| | | |
|---|---|---|
| DE | 102 36 998 A1 | 3/2004 |
| EP | 1 047 143 A2 | 10/2000 |
| JP | A-01-246767 | 10/1989 |
| JP | A-2000-090943 | 3/2000 |
| JP | A-2000-231929 | 8/2000 |
| JP | A-2004-006104 | 1/2004 |
| JP | A-2004-039540 | 2/2004 |
| JP | A-2004-103456 | 4/2004 |
| JP | A-2005-183141 | 7/2005 |
| WO | WO 03/092107 A1 | 11/2003 |

*Primary Examiner* — Zachary Best
(74) *Attorney, Agent, or Firm* — Oliff & Berridge, PLC (57) ABSTRACT

A gas separator for a fuel cell has a first plate that forms one face; a second plate that forms the other face of the gas separator; and a third plate located between the first plate and the second plate. The third plate has a cooling medium flow path forming hole defining a cooling medium flow path between the first plate and the second plate and is provided in at least part of an area overlapping an electrolyte layer and electrode layers in lamination. A flow rate regulator is provided in the cooling medium flow path and regulates a flow rate to have a higher flow rate during power generation of the fuel cell. A temperature distribution is determined according to an operating condition of the fuel cell or an environment surrounding the fuel cell.

16 Claims, 7 Drawing Sheets

(56) References Cited

U.S. PATENT DOCUMENTS

| | | | |
|---|---|---|---|
| 6,939,639 B2 * | 9/2005 | Inagaki et al. | 429/434 |
| 2002/0086196 A1 * | 7/2002 | Utsunomiya et al. | 429/34 |
| 2003/0124405 A1 * | 7/2003 | Rock | 429/34 |
| 2003/0129475 A1 * | 7/2003 | Enjoji et al. | 429/38 |
| 2004/0161658 A1 * | 8/2004 | Mizuno | 429/38 |
| 2004/0265672 A1 * | 12/2004 | Wei | 429/34 |
| 2007/0207365 A1 * | 9/2007 | Ohnuma | 429/38 |
| 2008/0280177 A1 * | 11/2008 | Ose et al. | 429/24 |
| 2009/0136805 A1 * | 5/2009 | Sato et al. | 429/26 |
| 2011/0097648 A1 | 4/2011 | Blank | |

\* cited by examiner

GAS SEPARATOR FOR FUEL CELLS AND FUEL CELL EQUIPPED WITH GAS SEPARATOR

TECHNICAL FIELD

The present invention relates to a gas separator for fuel cells and a fuel cell equipped with the gas separator.

BACKGROUND ART

Fuel cells increase their internal temperature in the course of power generation and generally have an internal cooling medium flow path for the flow of a cooling medium to keep the internal temperature of the fuel cells in a predetermined temperature range. In order to enhance the effect of restricting the overall temperature increase in the whole fuel cells, multiple cooling medium flow paths are provided for respective unit cells or for respective laminations of every predetermined number of unit cells and are arranged in parallel to the planes of the respective unit cells. For example, the cooling medium flow paths are formed inside gas separators as one constitutional element of the fuel cells. The gas separator is placed between each pair of adjacent unit cells for the purpose of separating a flow path of an oxidizing gas from a flow path of a fuel gas.

The operating conditions of the fuel cells, for example, the flow directions of the gases and the cooling medium inside the fuel cells, however, cause an uneven heat distribution inside the fuel cells in the course of power generation of the fuel cells. The temperature distribution inside the fuel cells is also affected by the environment surrounding the fuel cells, as well as the uneven heat distribution in the course of power generation of the fuel cells. Even in the presence of the multiple cooling medium flow paths formed inside the fuel cells to keep the operating temperature of the fuel cells in the predetermined temperature range, there may be an uneven temperature distribution inside the fuel cells. The uneven temperature distribution inside the fuel cells may worsen the power generation efficiency and the durability of the fuel cells. The even internal temperature of the fuel cells has accordingly been demanded.

DISCLOSURE OF THE INVENTION

For solving the problem of the prior art described above, there is a need of equalizing the internal temperature of fuel cells in the plane of each unit cell in the course of circulation of a cooling medium inside the fuel cells.

In order to satisfy at least part of the above and the other related demands, a first aspect of the present invention is directed to a gas separator for a fuel cell, which is assembled by lamination of the gas separator, an electrolyte layer, and electrode layers arranged across the electrolyte layer.

The gas separator includes: a first plate that forms one face of the gas separator; a second plate that forms the other face of the gas separator; a third plate that is located between the first plate and the second plate and has a cooling medium flow path forming hole, which is pierced in a thickness direction of the third plate to define a cooling medium flow path for flow of a cooling medium between the first plate and the second plate and is provided in at least part of an area overlapping the electrolyte layer and the electrode layers in lamination; and a flow rate regulator that is provided in the cooling medium flow path and regulates a flow rate of the cooling medium flowing in the cooling medium flow path to have a higher flow rate of the cooling medium in a higher temperature area in a temperature distribution in a plane of the gas separator during power generation of the fuel cell, where the temperature distribution is determined according to at least either of an operating condition of the fuel cell and an environment surrounding the fuel cell.

In the first aspect of the invention, the gas separator for the fuel cell has the higher flow rate of the cooling medium in the higher temperature area of the temperature distribution on the plane of the gas separator. The higher flow rate of the cooling medium leads to the higher cooling efficiency. This arrangement desirably provides the fuel cell having the substantially equalized temperature distribution in the plane of the gas separator.

A second aspect of the invention is directed to a fuel cell, which includes: an electrolyte layer; electrode layers that are arranged across the electrolyte layer; a gas flow path forming member that is arranged outside each of the electrode layers and forms a gas flow path for supply and discharge of a gas into and from the electrode layer; and the gas separator for the fuel cell in the first aspect of the invention, which is arranged further outside the gas flow path forming member.

The fuel cell in the second aspect of the invention has the substantially equalized temperature distribution in the plane of the gas separator. This arrangement desirably enhances the power generation efficiency and the durability of the fuel cell.

The technique of the invention is not restricted to the gas separator for the fuel cell or the fuel cell described above but is also actualized by diversity of other applications, for example, a method of equalizing the temperature distribution in the plane of the gas separator for the fuel cell.

BEST MODES OF CARRYING OUT THE INVENTION

Some modes of carrying out the invention are described below as preferred embodiments with reference to the accompanied drawings.

A. First Embodiment

Figure 1A:
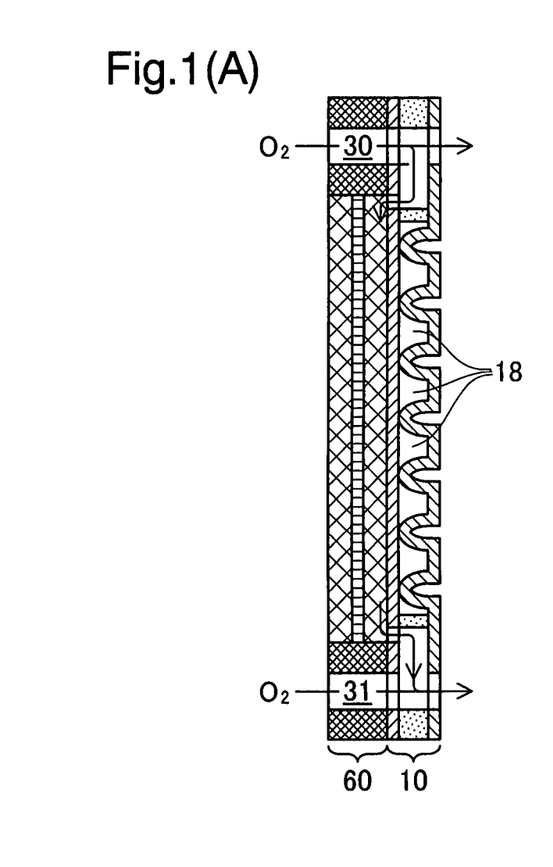
FIG. 1 is sectional views schematically illustrating the structure of fuel cells in a first embodiment of the invention.
Figure 1B:
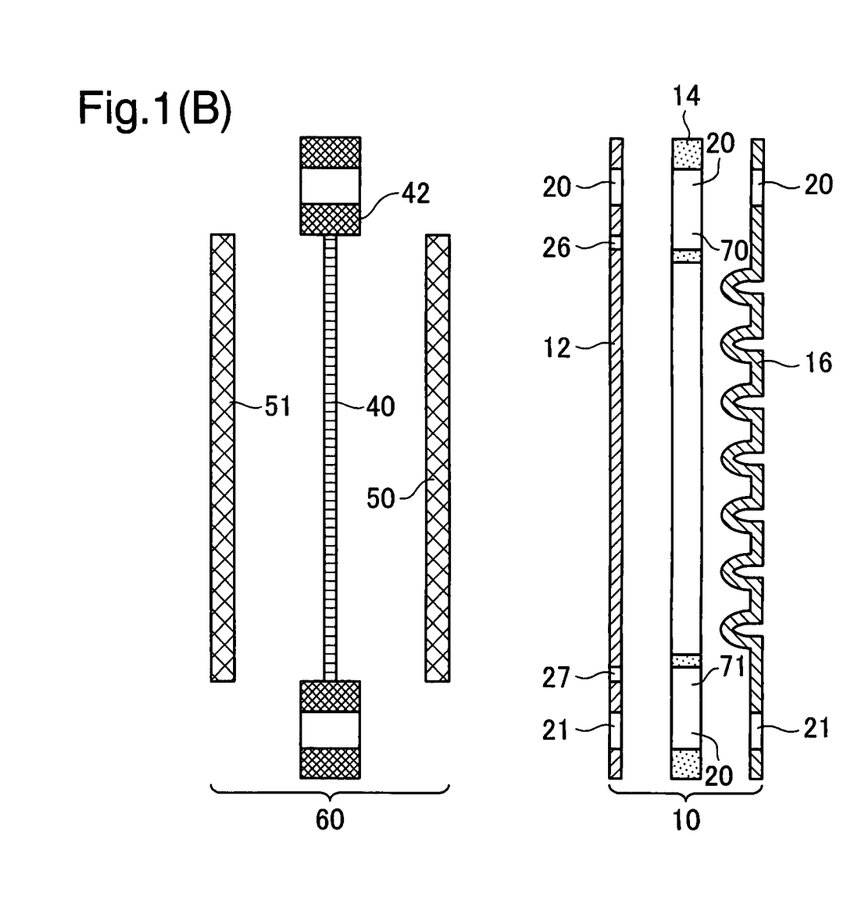

FIG. 1 is sectional views schematically illustrating the structure of fuel cells in a first embodiment of the invention. The fuel cells of this embodiment are assembled by sequentially laying gas separators 10, gas flow path forming members 50, MEAs (membrane electrode assemblies) 40, and gas flow path forming members 51 one upon another. A constituent unit of the fuel cells is a laminate of the gas separator 10, the MEA 40, and the gas flow path forming members 50 and 51 as shown in FIG. 1(A). The MEA 40, the gas flow path forming members 50 and 51, and three constituent plates of the gas separator 10, that is, a cathode side plate 12, a middle plate 14, and an anode side plate 16, are shown separately in the decomposed view of FIG. 1(B). The MEA 40 and the gas flow path forming members 50 and 51 constitute a unit cell 60 as a unit of power generation. The gas separator 10 is placed between each pair of adjacent unit cells 60 and forms a cooling medium flow path 18. The fuel cells of this embodiment are obtained by repeated lamination of the constituent unit including the unit cell 60 and the gas separator 10 shown in FIG. 1(A).

Figure 2A:
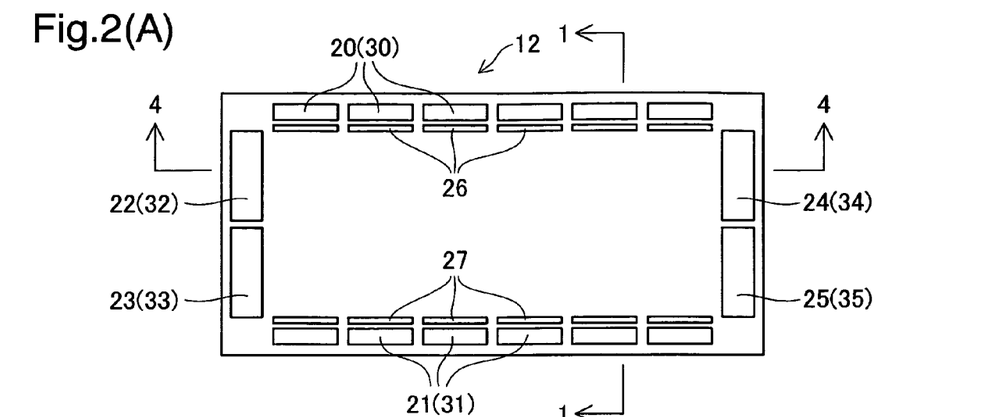
FIG. 2 is plan views schematically illustrating multiple plates constituting a gas separator in the fuel cells.
Figure 2B:
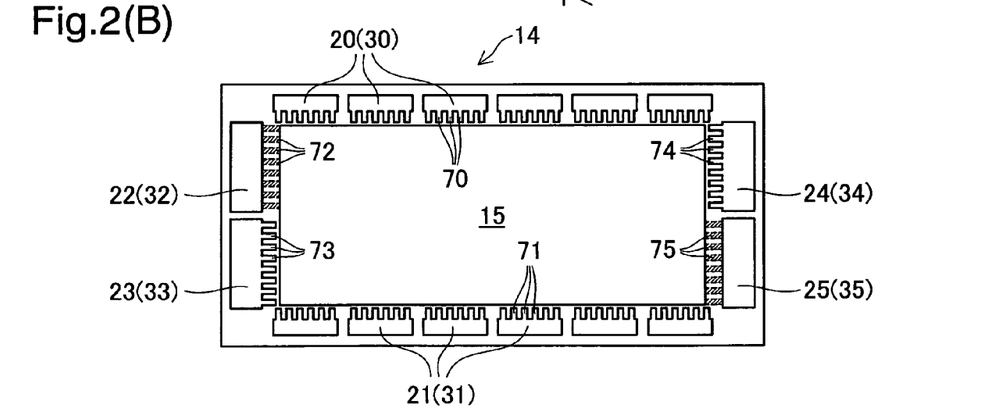
Figure 2C:
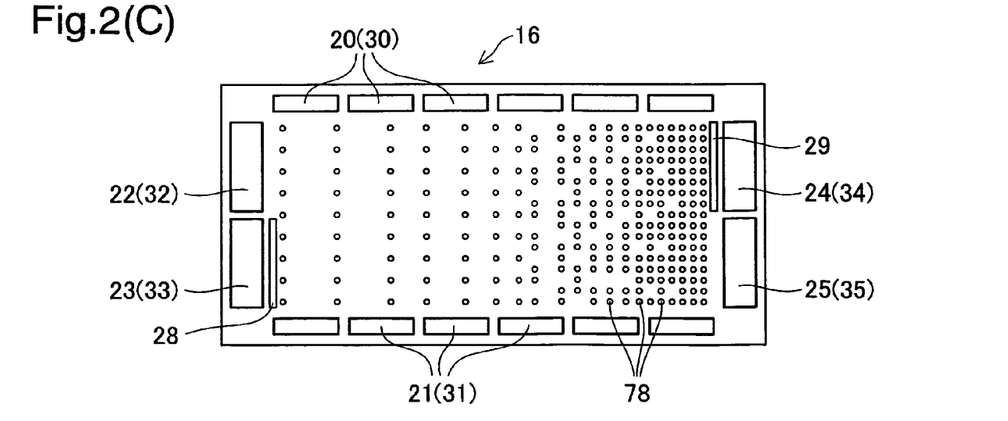

FIG. 2 is plan views schematically showing the cathode side plate 12, the middle plate 14, and the anode side plate 16 of the gas separator 10 having the three-layered structure. FIGS. 2(A), 2(B), and 2(C) respectively show the structure of the cathode side plate 12, the structure of the middle plate 14, and the structure of the anode side plate 16. The sectional view of FIG. 1(A) is taken on the line 1-1 in FIG. 2(A).

As shown in FIG. 2(A), the respective plates of the gas separator 10 are substantially rectangular thin plate members having practically the same circumferential dimensions. These plates have multiple through holes 21 to 25 that are extended along specified plate sides and are formed at corresponding positions on the respective outer circumferences. In assembly of the fuel cells by sequentially laying the gas separators 10 and the unit cells 60 one another, each lamination of the corresponding through holes forms a manifold that passes through the inside of the fuel cells in a laminating direction to allow the flow of a predetermined fluid.

Multiple through holes 20 (six through holes in the illustrated example of FIG. 2(A)) are formed along a predetermined side of the respective plates. In assembly of the fuel cells, lamination of the through holes 20 forms an oxidizing gas supply manifold 30 for the flow of an oxidizing gas supplied to the electrochemical reaction. Multiple through holes 21 (six through holes in the illustrated example of FIG. 2(A)) are formed along an opposite side of the respective plates facing the predetermined side. In assembly of the fuel cells, lamination of the through holes 21 forms an oxidizing gas exhaust manifold 31 for the flow of an oxidizing gas exhaust after the electrochemical reaction.

Two through holes 22 and 23 are formed along another side of the respective plates. The through hole 22 is located close to the predetermined side with the through holes 20, whereas the through hole 23 is located close to the opposite side with the through holes 21. In assembly of the fuel cells, lamination of the through holes 22 forms a cooling medium inflow manifold 32 for the flow of a cooling medium, which is distributed into the cooling medium flow path 18 in the gas separator 10. In assembly of the fuel cells, lamination of the through holes 23 forms a fuel gas exhaust manifold 33 for the flow of a fuel gas exhaust after the electrochemical reaction.

Two through holes 24 and 25 are formed along an opposed side of the respective plates facing the another side. The through hole 24 is located close to the predetermined side with the through holes 20, whereas the through hole 25 is located close to the opposite side with the through holes 21. In assembly of the fuel cells, lamination of the through holes 24 forms a fuel gas supply manifold 34 for the flow of a fuel gas supplied to the electrochemical reaction. In assembly of the fuel cells, lamination of the through holes 25 forms a cooling medium outflow manifold 35 for the flow of the cooling medium discharged from the cooling medium flow path 18 of the gas separator 10. In the illustration of FIG. 2, the reference numbers of the manifolds formed by the respective through holes are shown in parentheses with the reference numbers of the through holes.

The cathode side plate 12 has multiple through slits 26 and 27 on its outer circumference, in addition to the through holes 20 to 25. The multiple through slits 26 are formed respectively corresponding to and inside of the multiple through holes 20 and are arranged close to and substantially parallel to the multiple through holes 20. Similarly the multiple through slits 27 are formed respectively corresponding to and inside of the multiple through holes 21 and are arranged close to and substantially parallel to the multiple through holes 21.

The middle plate 14 has a substantially rectangular center through hole, which passes through a center area other than the outer circumference and is formed as a cooling medium flow path-forming hole 15, in addition to the through holes 20 to 25 formed on the outer circumference. The cooling medium flow path-forming hole 15 forms a cavity functioning as the cooling medium flow path 18, when the middle plate 14 is interposed between the cathode side plate 12 and the anode side plate 16. The through holes 20, 21, 23, and 24 formed in the middle plate 14 have a different shape from that of the corresponding through holes 20, 21, 23, and 24 formed in the other plates 12 and 16. In each of these through holes 20, 21, 23, and 24, a specific side facing the center of the middle plate 14 has plural projections protruded toward the center of the middle plate 14. The plural projections of the respective through holes 20, 21, 23, and 24 are hereafter referred to as connection projections 70, 71, 73, and 74. The middle plate 14 also has plural connection holes 72 to make the through hole 22 communicate with the cooling medium flow path-forming hole 15. The plural connection holes 72 are formed on the face of the middle plate 14 to be substantially parallel to one another and to connect the through hole 22 to the cooling medium flow path-forming hole 15. The middle plate 14 further has plural connection holes 75 to make the through hole 25 communicate with the cooling medium flow path-forming hole 15, in the same manner as the plural connection holes 72.

The anode side plate 16 has two through slits 28 and 29 on its outer circumference, in addition to the through holes 20 to 25. The through slit 28 is formed corresponding to and inside of the through hole 23 and is arranged close to and substantially parallel to the through hole 23. The through slit 29 is formed corresponding to and inside of the through hole 24 and is arranged close to and substantially parallel to the through hole 24. The anode side plate 16 also has multiple convexes 78 in a center area inside of the through holes 20 to 25 and the through slits 28 and 29. The multiple convexes 78 are protruded from a certain face of the anode side plate 16 in contact with the middle plate 14 and are formed over a whole area corresponding to the area of the cooling medium flow path-forming hole 15 of the middle plate 14. Namely the multiple convexes 78 are projected into the cavity of the cooling medium flow path-forming hole 15 of the middle plate 14 in the assembled gas separator 10. The cooling medium flow path-forming hole 15 and the multiple convexes 78 accordingly define the cooling medium flow path 18 for the flow of the cooling medium. The multiple convexes 78 are not uniformly arranged on the face of the anode side plate 16 but have a higher density on the side with the through holes 24 and 25 and a lower density on the side with the through holes 22 and 23. The varying formation density of the convexes 78 on the face of the anode side plate 16 varies the sectional flow area of the cooling medium flow path 18 and accordingly changes the flow rate of the cooling medium in the cooling medium flow path 18. Namely the multiple convexes 78 function as a flow rate regulator of regulating the flow rate of the cooling medium in the cooling medium flow path 18. A rear face of the anode side plate 16 opposite to the certain face with the convexes 78 has multiple concaves corresponding to the respective convexes 78 (see FIG. 1(B)).

The through slits 26 formed in the cathode side plate 12 and the connection projections 70 formed in the middle plate 14 define an oxidizing gas supply conduit, which introduces the flow of the oxidizing gas from the oxidizing gas supply manifold 30 via the inside of the gas separator 10 to the surface of the gas separator 10 in contact with the gas flow path forming member 50. The through slits 27 formed in the cathode side plate 12 and the connection projections 71 formed in the middle plate 14 define an oxidizing gas discharge conduit, which introduces the flow of the oxidizing gas from the surface of the gas separator 10 in contact with the gas flow path forming member 50 via the inside of the gas separator 10 into the oxidizing gas exhaust manifold 31. The through slit 29 formed in the anode side plate 16 and the connection projections 74 formed in the middle plate 14 define a fuel gas supply conduit, which introduces the flow of the fuel gas from the fuel gas supply manifold 34 via the inside of the gas separator 10 to the surface of the gas separator 10 in contact with the gas flow path forming member 51. The through slit 28 formed in the anode side plate 16 and the connection projections 73 formed in the middle plate 14 define a fuel gas discharge conduit, which introduces the flow of the fuel gas from the surface of the gas separator 10 in contact with the gas flow path forming member 51 via the inside of the gas separator 10 into the fuel gas exhaust manifold 33.

The cathode side plate 12 and the anode side plate 16 are thin plate members made of a conductive material, for example, stainless steel, titanium, titanium alloy, or another suitable metal material. The through holes 20 to 25 and the through slits 26 to 29 are formed by perforation, and the convexes 78 are formed by pressing with a die having predetermined concavo-convex structure. In the structure of this embodiment, the middle plate 14 is made of a resin laminate having a seal layer and a heat resistant resin layer. The assembling process of the gas separator 10 places the cathode side plate 12, the middle plate 14, and the anode side plate 16 one upon another in this sequence with positioning the corresponding through holes and integrates the respective plates 12, 14, and 16 by heating adhesion. Application of a conductive resin to the material resin of the middle plate 14 preferably reduces the internal resistance of the gas separator 10. The middle plate 14 may be made of a metal and may be attached to the other plates 12 and 16 by diffusion bonding. The resin material of the middle plate 14, however, enables bonding to the other plates 12 and 16 at lower temperatures and thus effectively prevents thermal deformation of the gas separator 10.

The MEA 40 of the unit cell 60 includes an electrolyte layer and catalyst electrode layers formed on both faces of the electrolyte layer. The fuel cells of this embodiment are polymer electrolyte fuel cells. The electrolyte layer is made of a solid polymer material and is, for example, a proton-conductive ion exchange membrane of a fluororesin containing perfluorocarbon sulfonic acid. The catalyst electrode layers contain a catalyst for accelerating the electrochemical reaction, for example, platinum or a platinum-containing alloy.

The gas flow path forming members 50 and 51 are plate members having electrical conductivity and gas permeability and are made of, for example, porous carbon material or porous metal material such as foamed metal or metal mesh. In the structure of this embodiment, the gas flow path forming members 50 and 51 are made of porous titanium material. Porous carbon layers are provided on the faces of the MEA 40 in contact with the gas flow path forming members 50 and 51.

The cavities formed inside the gas flow path forming members 50 and 51 function as flow paths of the gases supplied to the electrochemical reactions in the unit cell 60. The gas flow path forming member 50 located between the MEA 40 and the cathode side plate 12 forms an in-unit cell oxidizing gas flow path for the flow of the oxidizing gas. The gas flow path forming member 51 located between the MEA 40 and the anode side plate 16 forms an in-unit cell fuel gas flow path for the flow of the fuel gas.

Figure 3:
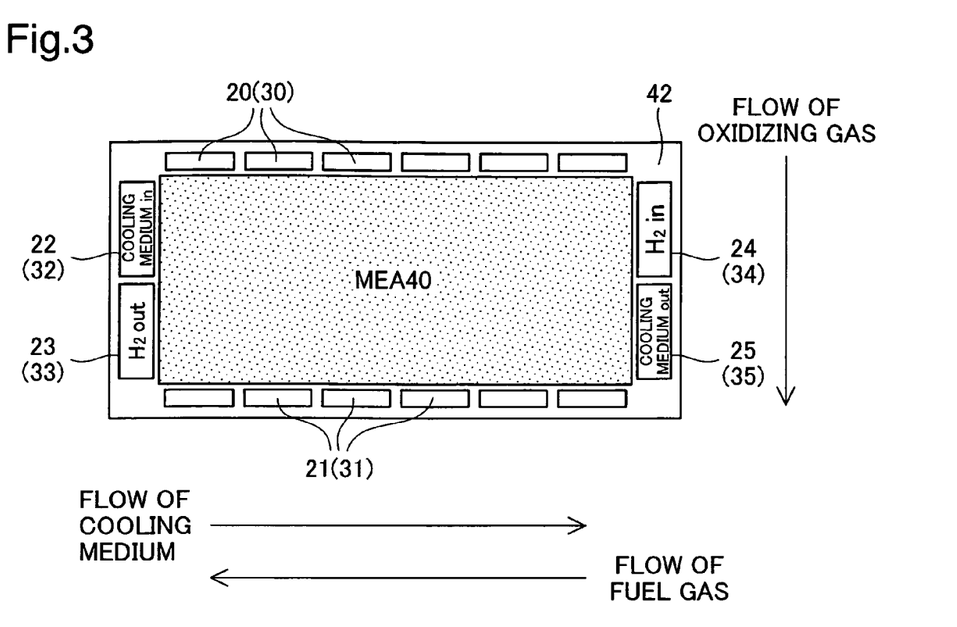
FIG. 3 is a plan view showing a seal member integrated with an MEA in the fuel cells.

A seal member 42 is provided between each pair of adjacent gas separators 10 and along the outer circumference of the MEA 40 and the gas flowpath forming members 50 and 41. The seal member 42 is made of an insulating resin material, for example, silicon rubber, butyl rubber, or fluororubber, and is integrated with the MEA 40. FIG. 3 is a plan view schematically showing the structure of the seal member 42 integrated with the MEA 40. The seal member 42 is rectangular in shape and has a substantially equal outer circumferential dimension to that of the gas separator 10. Like the gas separator 10, the seal member 42 has the through holes 20 to 25. In the illustration of FIG. 3, the through hole 22 for the cooling medium inflow manifold 32 is shown as 'Cooling Medium In', and the through hole 25 for the cooling medium outflow manifold 35 is shown as 'Cooling Medium Out'. The through hole 24 for the fuel gas supply manifold 34 is shown as '$H_2$ In', and the through hole 23 for the fuel gas exhaust manifold 33 is shown as '$H_2$ Out'.

Each unit cell 60 may be obtained by mounting the gas flow path forming members 50 and 51 onto the MEA 40 integrally formed with the seal member 42 or may otherwise be obtained by forming both the MEA 40 and the gas flow path forming members 50 and 51 integrally with the seal member 42. The seal member 42 is formed integrally with the other member (that is, the MEA 40 or the gas flow path forming members 50 and 51 joined with the MEA 40) by placing the outer circumference of the other member in the cavity of a die and injection molding the resin material into the cavity.

The gas separators 10 and the unit cells 60 manufactured as described above are alternately laid one upon another, such that the cathode side plate 12 is in contact with the gas flow path forming member 50 and the anode side plate 16 is in contact with the gas flow path forming member 51. The repeated lamination of the gas separators 10 and the unit cells 60 completes the fuel cells.

In the assembly of the fuel cells, the supply of the oxidizing gas introduced into the oxidizing gas supply manifold 30 flows through the oxidizing gas supply conduit including the connection projections 70 and the through slits 26 of each gas separator 10 and is distributed into the in-unit cell oxidizing gas flow path formed in the gas flow path forming member 50. The distributed oxidizing gas is flowed through the in-unit cell oxidizing gas flow path toward the oxidizing gas exhaust manifold 31, while being subjected to the electrochemical reaction. The flow direction of the oxidizing gas in the in-unit cell oxidizing gas flow path relative to the plane of the MEA 40 is shown by the arrow in FIG. 3. The oxidizing gas passing through the in-unit cell oxidizing gas flow path then flows through the oxidizing gas discharge conduit including the through slits 27 and the connection projections 71 of each gas separator 10 and is discharged out of the oxidizing gas exhaust manifold 31. The inflow and the outflow of the oxidizing gas into and out of the respective manifolds 30 and 31 are shown by the arrows in FIG. 1(A). The oxidizing gas is an oxygen-containing gas and is the air in this embodiment.

Figure 4:
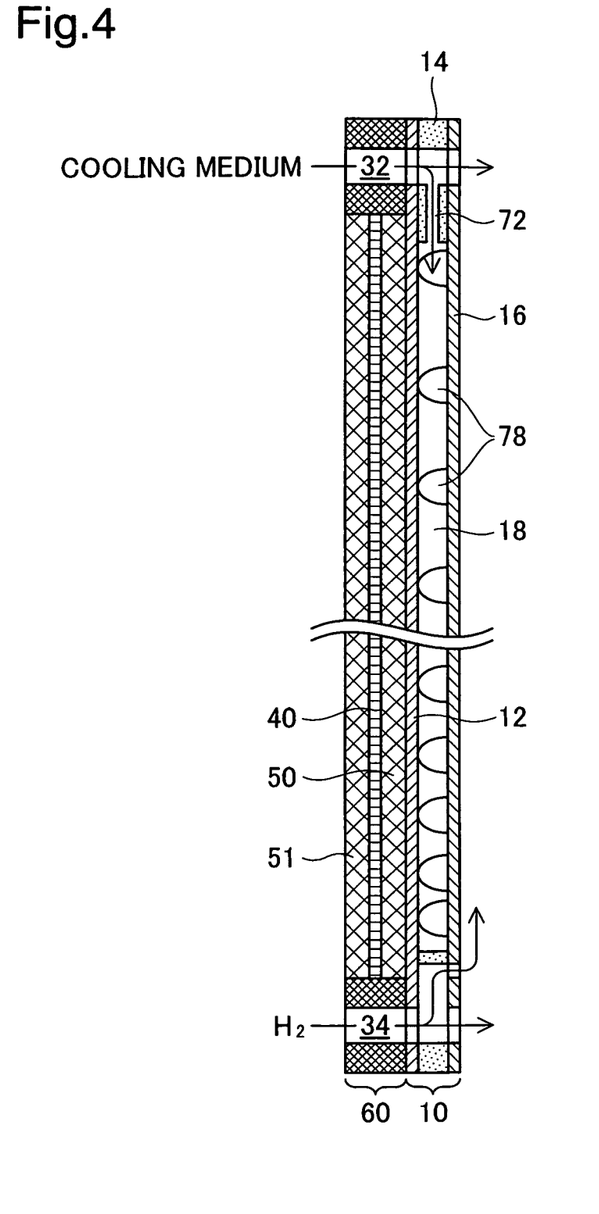
FIG. 4 is a sectional view schematically illustrating the structure of the fuel cells in the first embodiment.

In the assembly of the fuel cells, the flow of the cooling medium introduced into the cooling medium inflow manifold 32 passes through the connection holes 72 of the middle plate 14 in each gas separator 10 and is distributed into the cooling medium flow path 18. FIG. 4 is a sectional view showing a different cross section of the fuel cells from the cross section of FIG. 1(A). The sectional view of FIG. 4 is taken on the line 4-4 in FIG. 2(A). In the illustration of FIG. 4, the inflow of the cooling medium from the cooling medium inflow manifold 32 through the connection holes 72 into the cooling medium flow path 18 is shown by the arrow. The cross section of FIG. 4 is taken at the position of not cutting the convexes 78 provided on the anode side plate 16. The distributed cooling medium flows through the cooling medium flow path 18 toward the cooling medium outflow manifold 35. The flow direction of the cooling medium in the cooling medium flow path 18 relative to the plane of the MEA 40 is shown by the arrow in FIG. 3. The cooling medium passing through the cooling medium flow path 18 then flows through the connection holes 75 of the middle plate 14 and is discharged out of the cooling medium outflow manifold 35 (not shown). The cooling medium may be, for example, water, an antifreeze solution, or the air.

In the assembly of the fuel cells, the supply of the fuel gas introduced into the fuel gas supply manifold 34 flows through the flow gas supply conduit including the connection projections 74 and the through slit 29 of each gas separator 10 and is distributed into the in-unit cell fuel gas flow path formed in the gas flow path forming member 51. The inflow of the fuel gas from the fuel gas supply manifold 34 into the in-unit cell fuel gas flow path is shown by the arrow in FIG. 4. The distributed fuel gas is flowed through the in-unit cell fuel gas flow path toward the fuel gas exhaust manifold 33, while being subjected to the electrochemical reaction. The flow direction of the fuel gas in the in-unit cell fuel gas flow path relative to the plane of the MEA 40 is shown by the arrow in FIG. 3. The fuel gas passing through the in-unit cell fuel gas flow path then flows through the fuel gas discharge conduit including the through slit 28 and the connection projections 73 of each gas separator 10 and is discharged out of the fuel gas exhaust manifold 33 (not shown). The fuel gas is a hydrogen-containing gas and is a hydrogen gas of high purity in this embodiment.

There is an uneven temperature distribution in the plane of each unit cell 60 according to the flow directions of the oxidizing gas, the cooling medium, and the fuel gas. The flows of the oxidizing gas and the fuel gas cause the varying amount of heat produced by the electrochemical reaction in the plane. The flow of the cooling medium causes the varying degree of cooling in the plane. Namely there is an uneven temperature distribution in the plane.

Figure 5A:
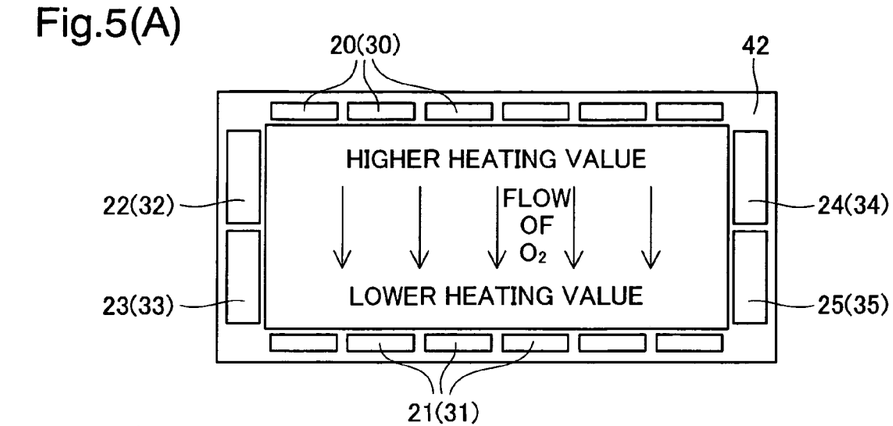
FIG. 5 shows the flow directions of a gas and a cooling medium and a temperature distribution in the plane of the gas separator.

FIG. 5 shows the flow directions of the oxidizing gas and the cooling medium and a temperature distribution in the plane of the gas separator. In general, a gas subjected to an electrochemical reaction has a higher content of an electrode active material in the upstream of the gas flow in the plane of each unit cell. The higher content of the electrode active material causes vigorous reaction and produces a greater amount of heat. In this embodiment where the air and the high-purity hydrogen gas are used as the oxidizing gas and as the fuel gas, the oxygen concentration in the oxidizing gas significantly affects the electrochemical reaction. A large amount of heat is produced especially in the upstream area of the in-unit cell oxidizing gas flow path. By considering only the flow direction of the oxidizing gas, the area closer to the through holes 20 is expected to have the higher heating value in the structure of this embodiment. The heating value is varied corresponding to the flow direction of the oxidizing gas in the plane of each unit cell as shown in FIG. 5(A).

Figure 5B:
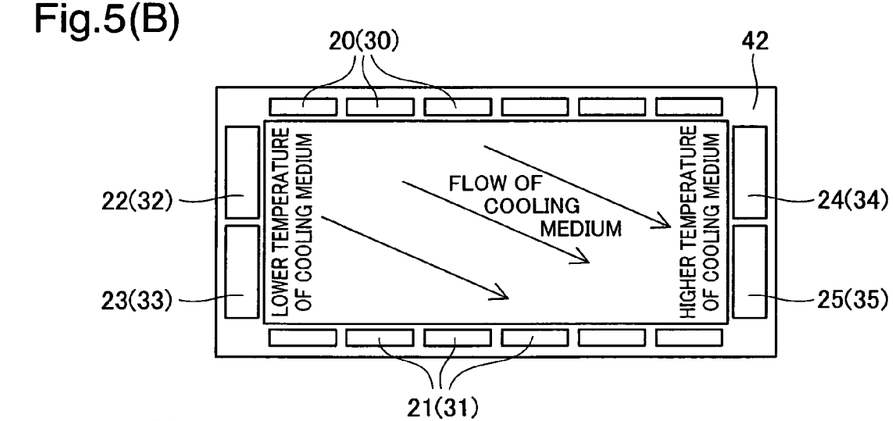

In general, the flow of a cooling medium has the lower temperature in the upstream of a cooling medium flow path. In the structure of this embodiment, the flow of the cooling medium is expected to have the lower temperature in the area closer to the through hole 22 for the cooling medium inflow manifold 32 and the higher temperature in the area closer to the through hole 25 for the cooling medium outflow manifold 35. The temperature of the cooling medium is varied corresponding to the flow direction of the cooling medium in the plane of each unit cell as shown in FIG. 5(B).

Figure 5C:
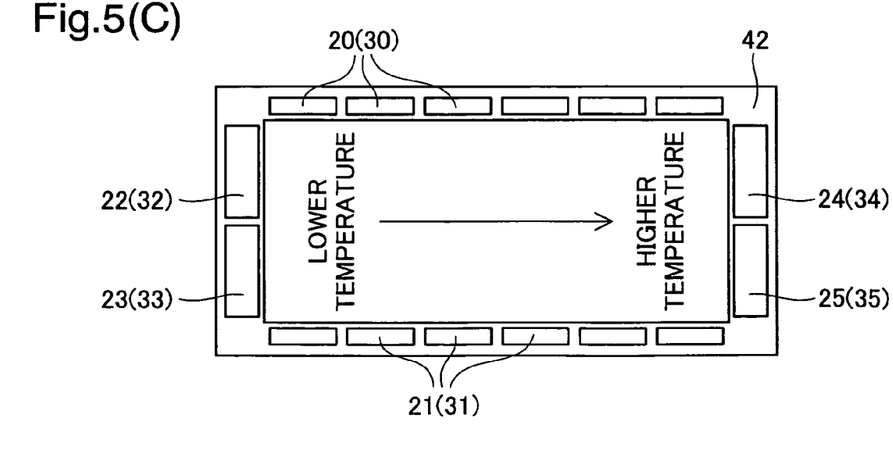

FIG. 5(C) shows a temperature distribution in the plane of each unit cell determined by the varying heating value and the varying temperature of the cooling medium, which are expected corresponding to the flow direction of the gas and the flow direction of the cooling medium. As shown in FIG. 5(C), in the structure of the embodiment, the plane of the gas separator has the higher temperature in the area closer to the through holes 24 and 25 and the lower temperature in the area closer to the through holes 22 and 23.

In the structure of the embodiment, the anode side plate 16 has the convexes 78 at the higher density in the area closer to the through holes 24 and 25 as explained previously. Namely the convexes 78 are formed at the higher density in the higher temperature area of the temperature distribution in the plane of the gas separator (in the plane of each unit cell), which is determined by the varying heating value and the varying temperature of the cooling medium. The formation density of the convexes 78 is varied corresponding to the flow direction of the cooling medium. The downstream area in the cooling medium flow path 18 is the higher temperature area of the temperature distribution and has the smaller sectional flow area and the higher flow rate of the cooling medium.

As described above, in the structure of the embodiment, the convexes 78 have the higher density in the higher temperature area of the temperature distribution in the plane of the gas separator, which is determined according to the operating conditions of the fuel cells, that is, according to the flow direction of the oxidizing gas and the flow direction of the cooling medium. The higher density of the convexes 78 leads to the higher flow rate of the cooling medium and accordingly enhances the cooling efficiency of the cooling medium in the higher temperature area. This arrangement effectively equalizes the temperature distribution in the plane of the gas separator. The even internal temperature distribution in the plane of each unit cell desirably enhances the power generation efficiency and the durability of the fuel cells.

In the fuel cells of the embodiment, the gas flow path forming members 50 and 51 of the flat plates form the in-unit cell gas flow paths. The gas separator has the connecting gas flow conduits that connect the respective gas manifolds with the gas flow path forming members (that is, the in-unit cell gas flow paths). The in-unit cell gas flow paths and the connecting gas flow conduits connecting the respective gas manifolds with the in-unit cell gas flow paths are provided irrespective of the surface configuration of the gas separator 10. The shape of the concaves provided on the rear face of the anode side plate 16 opposite to the certain face with the convexes 78 accordingly does not affect the configurations of the gas flow paths including the in-unit cell gas flow paths and the connecting gas flow conduits or the flows of the gases in the in-unit cell gas flow paths. The arrangement of the convexes 78 is thus not restricted by the gas flows but is determined to equalize the expected temperature distribution according to the operating conditions of the fuel cells.

The cooling medium flow path 18 of any desired shape is formed inside the gas separator 10 without being affected by the configuration of the gas flow paths. The anode side plate 16 is accordingly not required to have a large thickness for formation of the convexes 78 with elimination of effects on the configurations of the gas flow paths. This enables thickness reduction of the gas separator 10 and size reduction of the whole fuel cells. The fuel cells of this embodiment are easily assembled by simple alternate lamination of the thin plate members of substantially the same dimensions, that is, the seal members 42 integrated with MEAs 40 and the gas separators 10.

The respective apexes of the convexes 78 are not essentially required to be in contact with the cathode side plate 12, as long as adjacent unit cells 60 located via the gas separator 10 are electrically connected. The varying formation density of the convexes 78 ensures the similar effects. The arrangement of the convexes 78 to be in contact with the cathode side plate 12, however, desirably reduces the internal resistance of the fuel cells and enhances the strength of the gas separators 10.

In the high temperature area of the temperature distribution in the plane of the gas separator shown in FIG. 5(C), the area close to the through hole 24 has the higher oxygen content in the oxidizing gas and the higher heating value and is thus expected to have the especially higher temperature. In the low temperature area of the temperature distribution shown in FIG. 5(C), the area close to the through hole 23 has the lower oxygen content in the oxidizing gas and the lower heating value and is thus expected to have the especially lower temperature. In the structure of this embodiment, the formation density of the convexes 78 is not varied strictly corresponding to this expected temperature distribution. The area closer to the through holes 24 and 25 has the higher formation density of the convexes 78, whereas the area closer to the through holes 23 and 22 has the lower formation density of the convexes 78. When a predetermined flow path cross section in the cooling medium flow path has areas of different flow resistances, the cooling medium tends to flow through the area of the lower flow resistance. The cooling medium may accordingly not have the higher flow rate in the area having the higher formation density of the convexes 78 and the higher flow resistance. The multiple convexes 78 are thus arranged to have no significant variation in formation density in the same flow path cross section and effectively equalize the temperature distribution in the whole plane of the gas separator by taking into account the flow direction of the cooling medium.

B. Modifications of First Embodiment

Figure 6:
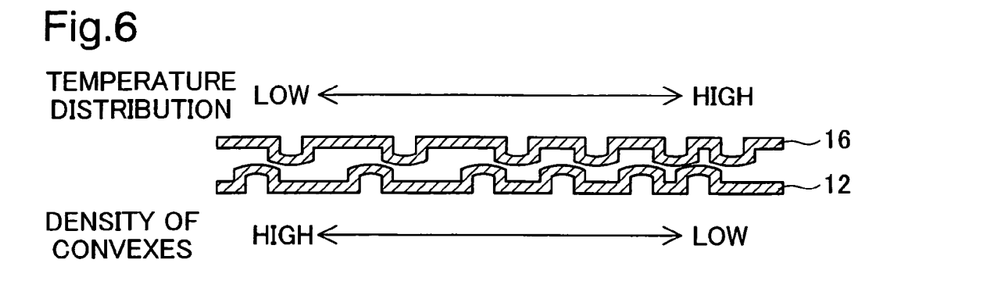
FIG. 6 is a sectional view schematically showing one modified structure of the first embodiment.

In the structure of the first embodiment, the multiple convexes 78 defining the cooling medium flow path 18 and working as the flow rate regulator are formed on the anode side plate 16. These multiple convexes may alternatively be formed on the cathode side plate 12 or may be formed on both the anode side plate 16 and the cathode side plate 12. FIG. 6 is a sectional view showing one modified structure where convexes are formed on both the anode side plate 16 and the cathode side plate 12. FIG. 6 schematically illustrates the relation between the expected temperature distribution in the plane of the gas separator 10 or the unit cell and the formation density of the convexes. The outer circumference structure of the gas separator 10 including the middle plate 14 is omitted from the illustration. In the case of formation of the convexes by press working, there is a technical limit of enhancing the formation density of the convexes. Formation of the convexes on both the anode side plate 16 and the cathode side plate 12 readily increases the density of the convexes according to the requirement.

Figure 7:
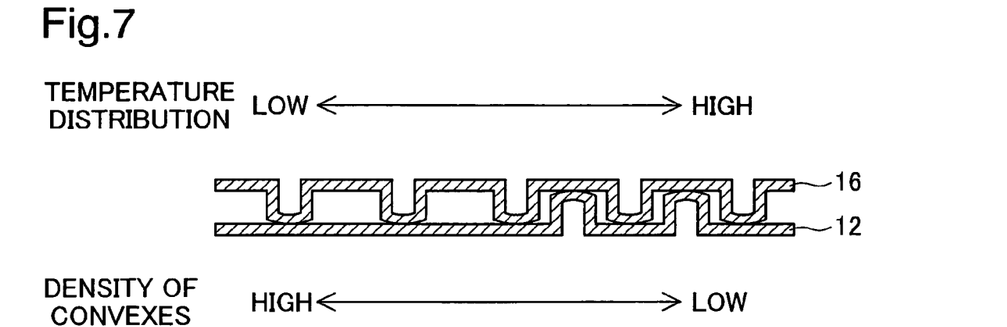
FIG. 7 is a sectional view schematically showing another modified structure of the first embodiment.

In the gas separator of FIG. 6, neither the convexes provided on the cathode side plate 12 nor the convexes provided on the anode side plate 16 are in contact with the opposite plate 16 or 12. The convexes may be arranged to be in contact with the respective opposite plates. FIG. 7 is a sectional view showing another modified structure where convexes are formed on both the anode side plate 16 and the cathode side plate 12 to be in contact with the respective opposite plates 12 and 16. In this modified structure, the increased formation density of the convexes in the higher temperature area of the expected temperature distribution in the plane of the gas separator regulates the flow rate of the cooling medium and equalizes the temperature distribution in the whole plane of the gas separator.

The press forming technique is desirably applied to formation of the convexes 78, because of the easy workability without increasing the total weight of the gas separator 10. The press forming technique is, however, not essential but any other suitable technique may be adopted for formation of the convexes 78. For example, convexes may be formed by mounting heaps of a metal material or another conductive material on a base plate. In the structure of the first embodiment, the concaves on the rear face (that is, on the side of the in-unit cell gas flow path) of the convexes formed by press working may be filled with a suitable material. Compared with the concaves formed on the rear face of the convexes, the flat surface of the plate on the side of the in-unit cell gas flow path has the less effect on the gas flow in the in-unit cell gas flow path.

C. Second Embodiment

In the gas separator 10 of the fuel cells of the first embodiment, the convexes 78 formed on the cathode side plate 12 work as the flow rate regulator of the cooling medium. The flow rate regulator is, however, not restricted to this structure but may be provided separately from the cathode side plate 12 and the anode side plate 16. This structure is described below as a second embodiment.

Figure 8:
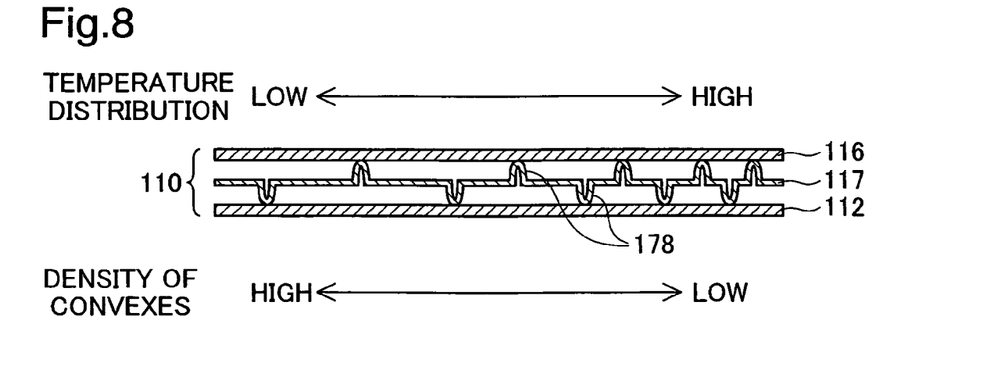
FIG. 8 is a sectional view schematically illustrating the structure of a gas separator in a second embodiment of the invention.

FIG. 8 is a sectional view showing the structure of a gas separator 110 in the second embodiment. The gas separator 110 is usable in place of the gas separator 10 in the fuel cells of the first embodiment. The gas separator 110 has a three-layered structure including a cathode side plate 112, a middle plate 114, and an anode side plate 116 and further includes a flow rate regulator 117. The cathode side plate 112 and the middle plate 114 have the same dimensions as those of the cathode side plate 12 and the middle plate 14 of the first embodiment. The anode side plate 116 has through holes 20 through 25 and through slits 28 and 29 in the same manner as the anode side plate 16 of the first embodiment but does not have convexes on the surface. The outer circumference structure of the gas separator 110 including the middle plate 114 is omitted from the illustration of FIG. 8. FIG. 8 shows the cathode side plate 112, the anode side plate 116, and the flow rate regulator 117 provided between the cathode side plate 112 and the anode side plate 116.

The flow rate regulator 117 has convexes formed on both faces of a metal thin plate, for example, by press working. The flow rate regulator 117 is located in the cavity formed between the cathode side plate 112 and the anode side plate 116 by the cooling medium flow path-forming hole 15 of the middle plate 114. The flow rate regulator 117 has multiple convexes 178 on both the face in contact with the cathode side plate 112 and the face in contact with the anode side plate 116. The convexes 178 are formed on the flow rate regulator 117 to have the higher density in the higher temperature area of the temperature distribution determined according to the operating conditions, like the convexes 78 formed on the anode side plate 16 in the structure of the first embodiment.

In the fuel cells having the gas separators 110 of this structure, the cooling medium has the higher flow rate in the area with the higher formation density of the convexes 178 in the plane of the unit cell. This arrangement effectively equalizes the temperature distribution in the plane of the gas separator or in the plane of the unit cell as in the first embodiment. The respective apexes of the convexes 178 are not essentially required to be in contact with the cathode side plate 112 or the anode side plate 116, as long as adjacent unit cells located via the gas separator 110 are electrically connected. The arrangement of the convexes 178 to be in contact with the cathode side plate 112 and in the anode side plate 116, however, desirably reduces the internal resistance of the fuel cells and enhances the strength of the gas separators 110. The flow rate regulator 117 is not required to have the convexes on both the face in contact with the cathode side plate 112 and the face in contact with the anode side plate 116. Formation of multiple convexes protruded toward at least one of the cathode side plate 112 and the anode side plate 116 enables the increase in flow rate of the cooling medium in the higher temperature area.

D. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

(1) In the first and the second embodiments, the flow rate regulator has the convexes as shown in FIG. 1 or FIG. 8. These convexes are, however, not essential, and the flow rate regulator may have any different shape to regulate the flow rate of the cooling medium. The configuration of the flow rate regulator is determined to have different flow rates of the cooling medium in the different areas of the cooling medium flow path by substantially changing the sectional flow area and attain the higher flow rate of the cooling medium in the higher temperature area.

(2) In the first and the second embodiments, the flow rate of the cooling medium is increased in the area close to the through holes 24 and 25 and is decreased in the area close to the through holes 22 and 23. The regulation of the flow rate of the cooling medium is not restricted to this arrangement but may be set adequately according to the flow directions of the gases and the cooling medium. FIG. 9 shows one modified example having different flow directions of the gases and the cooling medium from those in the first embodiment and the second embodiment.

Figure 9A:
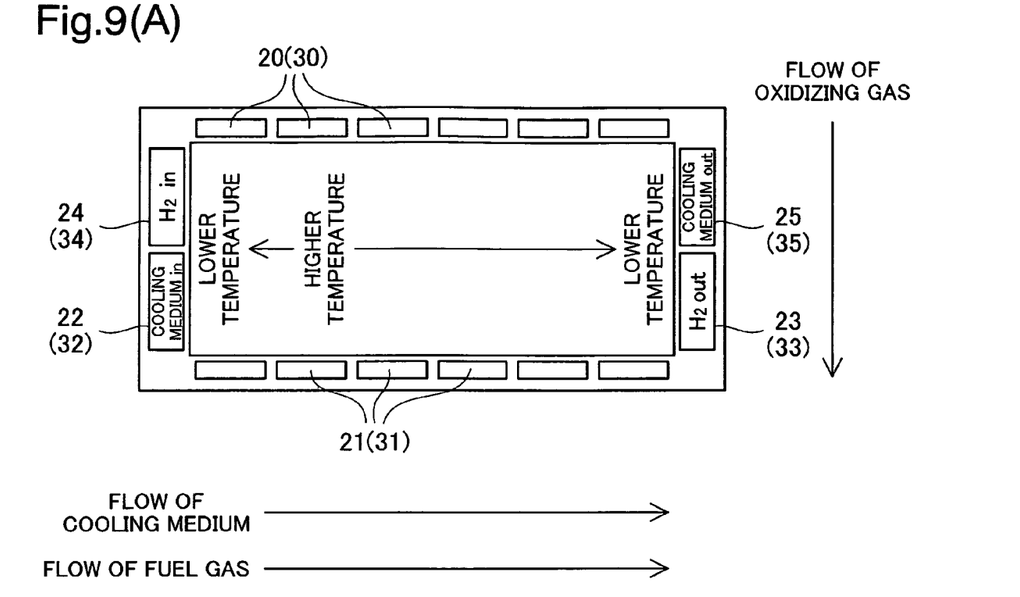
FIG. 9 shows the structure of one modified example.
Figure 9B:
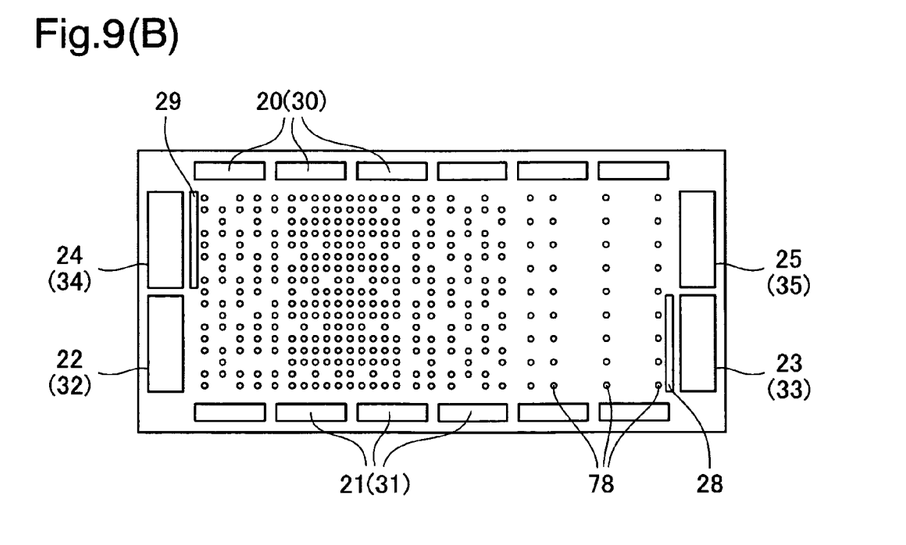

FIG. 9(A) shows the flow directions of the gases and the cooling medium in the plane of the unit cell and the temperature distribution in the plane of the gas separator. FIG. 9(B) shows an arrangement of convexes formed on an anode side plate as a flow rate regulator in the similar manner to the structure of the first embodiment. The through holes and the corresponding manifolds that are identical with those of the first embodiment and the second embodiment are expressed by the like numerals.

In the plane of the unit cell of FIG. 9, the cooling medium and the fuel gas have the same flow directions. In this structure, a slightly inner area or a slightly downstream area in the flows of the cooling medium and the fuel gas is expected to have the higher temperature in the temperature distribution than the area close to the through holes 22 and 24 for the inflows of the cooling medium and the fuel gas into the plane of the unit cell (see FIG. 9(A)). In the structure having the same flow directions of the fuel gas and the cooling medium, the area close to the inflows of the fuel gas and the cooling medium has a restricted degree of temperature increase, because of the low-temperature cooling medium. The slightly downstream area has the increased temperature of the cooling medium and the higher activity of the electrochemical reaction, thereby having the higher temperature in the temperature distribution. In this structure, the convexes 78 are formed to have the higher formation density in the higher temperature area and to decrease the formation density with a decrease in temperature as shown in FIG. 9(B).

(3) In the first embodiment and the second embodiment, the higher temperature area to have the higher flow rate of the cooling medium and the lower temperature area to have the lower flow rate of the cooling medium are set based on the temperature distribution in the plane of the gas separator during power generation of the fuel cells, which is determined according to the operating conditions of the fuel cells, that is, the flow directions of the fuel gas, the oxidizing gas, and the cooling medium. The higher temperature area and the lower temperature area may be set by taking into account any additional condition, for example, an environmental temperature condition in which the fuel cells are placed.

The internal temperature of the fuel cells may be affected by the environmental temperature in the surroundings of the fuel cells. For example, when a certain heat-producing device is located close to the fuel cells, the internal temperature of the fuel cells in the area closer to the heat-producing device is increased by the effect of the heat-producing device. In this environment, a flow rate regulator is provided according to the temperature distribution in the plane of the gas separator by taking into account the potential effect of the heat-producing device on the increase in internal temperature of the fuel cells. The configuration of the flow rate regulator is determined by additionally taking into account the various factors affecting the temperature distribution inside the fuel cells. This arrangement further enhances the effect of equalizing the temperature distribution in the plane of the gas separator.

(4) The technique of the invention is not restricted to the polymer electrolyte fuel cells but is also applicable to other types of fuel cells. Application of the invention to any type of fuel cells assembled as an alternate lamination of unit cells and gas separators having a three-layered structure to define an inner cooling medium flow path effectively equalizes the temperature distribution in the plane of the gas separator.

The invention claimed is:

1. A gas separator for a fuel cell, which is assembled by lamination of the gas separator, an electrolyte layer, and electrode layers arranged across the electrolyte layer, the gas separator comprising:
    a first plate that forms one face of the gas separator;
    a second plate that forms the other face of the gas separator;
    a third plate that is located between the first plate and the second plate and has a cooling medium flow path forming hole, which is pierced in a thickness direction of the third plate to define a cooling medium flow path for flow of a cooling medium between the first plate and the second plate, wherein the cooling medium flow path-forming hole overlaps a part of the electrolyte layer and the electrode layers in lamination; and
    a flow rate regulator that is provided in the cooling medium flow path defined by the cooling medium flow path-forming hole, the flow rate regulator regulates a flow rate of the cooling medium flowing in the cooling medium flow path to have a higher flow rate of the cooling medium in a higher temperature area in a temperature distribution in a plane of the gas separator during power generation of the fuel cell, wherein the temperature distribution is determined according to at least either of an operating condition of the fuel cell and an environment surrounding the fuel cell, wherein:

the flow rate regulator has multiple protrusions, which are formed on at least one of the first plate and the second plate to be protruded into the cooling medium flow path and to be arranged and distributed in a two-dimensional manner in the entire cooling medium flow path, the multiple protrusions being provided to be away from one another such that the higher temperature area of the temperature distribution has a higher formation density, and the flow rate regulator is configured to decrease a substantial sectional flow area of the cooling medium flow path in the higher temperature area of the temperature distribution.

2. The gas separator for the fuel cell in accordance with claim 1, wherein the first plate and the second plate are metal thin plates, and the multiple protrusions are formed on at least one of the first plate and the second plate by press working.

3. The gas separator for the fuel cell in accordance with claim 1, wherein respective apexes of the multiple protrusions are in contact with the first plate or the second plate as an opposed surface.

4. A fuel cell, comprising:
an electrolyte layer;
electrode layers that are arranged across the electrolyte layer;
a gas flow path forming member that is arranged outside each of the electrode layers and forms a gas flow path for supply and discharge of a gas into and from the electrode layer; and
the gas separator for the fuel cell in accordance with claim 1, which is arranged further outside the gas flow path forming member.

5. The fuel cell in accordance with claim 4, wherein the temperature distribution determined according to the operating condition of the fuel cell is based on an uneven distribution of a heating value, which depends upon flow directions of a fuel gas and an oxidizing gas on the plane of the gas separator, and a flow direction of the cooling medium on the plane of the gas separator.

6. The fuel cell in accordance with claim 4, wherein the gas flow path forming member is an electrically conductive porous plate and is arranged to be in contact with either the one face or the other face of the gas separator.

7. The fuel cell in accordance with claim 6, wherein the gas separator for the fuel cell further has:
a first through hole that is pierced in a thickness direction of the gas separator and forms a gas supply manifold for flow of a gas supplied to the electrode layer;
a second through hole that is pierced in the thickness direction of the gas separator and forms a gas exhaust manifold for flow of the gas discharged from the electrode layer;
a gas supply conduit that introduces the gas from the gas supply manifold via inside of the gas separator to a surface of the gas separator facing the gas flow path forming member; and
a gas discharge conduit that introduces the gas from the surface of the gas separator facing the gas flow path forming member via the inside of the gas separator to the gas exhaust manifold.

8. A gas separator for a fuel cell, which is assembled by lamination of the gas separator, an electrolyte layer, and electrode layers arranged across the electrolyte layer, the gas separator comprising:
a first plate that forms one face of the gas separator;
a second plate that forms the other face of the gas separator;
a third plate that is located between the first plate and the second plate and has a cooling medium flow path-forming hole, which is pierced in a thickness direction of the third plate to define a cooling medium flow path for flow of a cooling medium between the first plate and the second plate, wherein the cooling medium flow path-forming hole overlaps a part of the electrolyte layer and the electrode layers in lamination; and
a flow rate regulator that is provided in the cooling medium flow path defined by the cooling medium flow path-forming hole, the flow rate regulator regulates a flow rate of the cooling medium flowing in the cooling medium flow path to have a higher flow rate of the cooling medium in a higher temperature area in a temperature distribution in a plane of the gas separator during power generation of the fuel cell, wherein the temperature distribution is determined according to at least either of an operating condition of the fuel cell and an environment surrounding the fuel cell, wherein:

the flow rate regulator is provided separately from the third plate and includes a base plate that is arranged practically in parallel with the third plate and multiple protrusions that are protruded from at least one face of the base plate to have a higher formation density in the higher temperature area of the temperature distribution, the multiple protrusions being provided to be arranged and distributed in a two-dimensional manner in the entire cooling medium flow path and to be away from one another such that the higher temperature area of the temperature distribution has a higher formation density, and the flow rate regulator is configured to decrease a substantial sectional flow area of the cooling medium flow path in the higher temperature area of the temperature distribution.

9. The gas separator for the fuel cell in accordance with claim 8, wherein the one face and the other face of the gas separator formed by the first plate and the second plate are flat surfaces.

10. The gas separator for the fuel cell in accordance with claim 8, wherein respective apexes of the multiple protrusions are in contact with the first plate or the second plate as an opposed surface.

11. A fuel cell, comprising:
an electrolyte layer;
electrode layers that are arranged across the electrolyte layer;
a gas flow path forming member that is arranged outside each of the electrode layers and forms a gas flow path for supply and discharge of a gas into and from the electrode layer; and
the gas separator for the fuel cell in accordance with claim 8, which is arranged further outside the gas flow path forming member.

12. The fuel cell in accordance with claim 11, wherein the temperature distribution determined according to the operating condition of the fuel cell is based on an uneven distribution of a heating value, which depends upon flow directions of a fuel gas and an oxidizing gas on the plane of the gas separator, and a flow direction of the cooling medium on the plane of the gas separator.

13. The fuel cell in accordance with claim 11, wherein the gas flow path forming member is an electrically conductive porous plate and is arranged to be in contact with either the one face or the other face of the gas separator.

14. The fuel cell in accordance with claim 13, wherein the gas separator for the fuel cell further has:
- a first through hole that is pierced in a thickness direction of the gas separator and forms a gas supply manifold for flow of a gas supplied to the electrode layer;
- a second through hole that is pierced in the thickness direction of the gas separator and forms a gas exhaust manifold for flow of the gas discharged from the electrode layer;
- a gas supply conduit that introduces the gas from the gas supply manifold via inside of the gas separator to a surface of the gas separator facing the gas flow path forming member; and
- a gas discharge conduit that introduces the gas from the surface of the gas separator facing the gas flow path forming member via the inside of the gas separator to the gas exhaust manifold.

15. The gas separator for the fuel cell in accordance with claim 1, wherein the higher temperature area of the temperature distribution is downstream of the flow of the cooling medium flow path.

16. The gas separator for the fuel cell in accordance with claim 8, wherein the higher temperature area of the temperature distribution is downstream of the flow of the cooling medium flow path.

* * * * *